United States Patent [19]

Rettew et al.

[11] Patent Number: 5,558,735
[45] Date of Patent: Sep. 24, 1996

[54] METHOD FOR MAKING LAMINATE WITH U. V. CURED POLYMER COATING

[75] Inventors: Richard R. Rettew, Fort Mill, S.C.; Richard T. Almashy; Scott F. Lett, both of Monroe, N.C.

[73] Assignee: Square D Company, Palatine, Ill.

[21] Appl. No.: 257,069

[22] Filed: Jun. 9, 1994

Related U.S. Application Data

[63] Continuation-in-part of Ser. No. 110,025, Aug. 20, 1993, abandoned, which is a continuation-in-part of Ser. No. 815,314, Dec. 27, 1991, abandoned.

[51] Int. Cl.$^6$ .............................. B32B 31/06; B32B 31/12; B32B 31/26
[52] U.S. Cl. .................................... 156/275.5; 156/275.7; 427/386; 427/388.1; 427/388.2; 427/516; 427/520; 427/521
[58] Field of Search .............................. 156/275.5, 275.7; 148/108; 427/386, 388.1, 388.2, 508, 516, 519, 520, 521

[56] References Cited

U.S. PATENT DOCUMENTS

| | | | |
|---|---|---|---|
| 3,222,234 | 12/1965 | De Jean et al. | 156/275.5 X |
| 4,119,479 | 10/1978 | Williams et al. | 156/275.5 |
| 4,239,077 | 12/1980 | Dixon et al. | 156/275.5 X |
| 4,481,258 | 11/1984 | Sattler et al. | 427/519 X |
| 4,605,465 | 8/1986 | Morgan | 156/275.5 X |
| 4,648,929 | 3/1987 | Siman | 156/275.5 X |
| 4,705,578 | 11/1987 | Lin et al. | 148/108 |
| 4,880,486 | 11/1989 | Maeda | 156/275.5 X |
| 4,892,764 | 1/1990 | Drain et al. | 156/275.5 X |
| 5,102,488 | 4/1992 | Hayama et al. | 156/275.5 |

*Primary Examiner*—Arthur L. Corbin
*Attorney, Agent, or Firm*—David Russell Stacey; Larry I. Golden

[57] ABSTRACT

Disclosed is a method for making a laminate having utility in an electrical inductive apparatus, which first comprises coating at least one side of a metal substrate with a solventless liquid resin system comprising an ultraviolet radiation curable acrylic or vinyl monomer and a heat reactive thermoset adhesive resin. The resin system on the coated metal substrate is then exposed to ultraviolet radiation to cure the ultraviolet radiation curable monomer. The resin system is now a tacky solid layer. The laminates so formed can be assembled into components for use in applications such as electric power transformers, ignition coils, generators, chokes, reactors, solenoids ballasts, motors and electronics, in which prior art laminates have been utilized. The assembled laminates are then exposed to sufficient heat to cure the heat reactive thermoset resin and adhere the laminate layers together.

13 Claims, 2 Drawing Sheets

METHOD FOR MAKING LAMINATE WITH U. V. CURED POLYMER COATING

CONTINUING APPLICATION DATA

This application is a Continuation-in-Part of U.S. application Ser. No. 08/110,025, filed Aug. 20, 1993, now abandoned, which is a Continuation-in-Part of U.S. application Ser. No. 07/815,314, filed Dec. 27, 1991 now abandoned.

BACKGROUND OF THE INVENTION

1. Field of the Invention

The present invention relates to laminations and to methods for their making. In another aspect, the present invention relates to laminations having polymer coatings and to methods for their making. In still another aspect, the present invention relates to metal laminate structures formed from such laminations for electromagnetic devices such as motors, transformers and ballasts, having ultraviolet cured polymer coatings and to methods for their making.

2. Description of the Related Art

There are a number of applications such as electric power transformers, motors and electronics employing thin gauge sheets. Thin gauge electrical steel sheets or amorphous metal sheets for electrical applications reduce magnetically induced eddy currents by reducing the cross-sectional area through which those currents may flow. However, the core losses in electrical transformers used by electrical utility companies represent a significant loss of energy generated, even though electrical transformers are highly efficient.

It is well known that eddy current losses of electrical steel sheets can be decreased by reducing the sheet thickness and providing the sheets with an insulating film on the surface thereof. In the manufacture of cores for electric motors and transformers, the electrical steel sheets are continuously formed into blanks having the shape of a core, a predetermined number of the blanked sections are laminated together, and the edges of the resultant laminate core are fixed by welding. The insulating film is, therefore, required to exhibit not only an insulative property but also a number of other necessary properties, such as blanking capability, adhesion, lamination welding, heat resistance, and resistance against oil. It must also provide a high space factor.

A number of prior art patents disclose methods of forming the insulating film which attempt to satisfy these properties.

For example, one method discloses employing phosphate or chromate as components for forming an insulating coating. While the coating formed has good heat resistance and weldability, the blanking and adhesion properties are not satisfactory.

Japanese Examined Patent Publication No. 49-19078 aims to satisfy both the blanking property and the weldability requirements and proposes to form on an electrical steel sheet an insulating film having a surface roughness of $H_{max}$ of 2 mu or more by utilizing a dispersion of organic particles in the treating resin. However, this method suffers from a difficulty in achieving a good organic particle dispersion which affect the manufacture of the film and the adhesion of the film to the steel sheet.

Japanese Examined Patent Publication No. 55-21111 proposes a technique which addresses the problems of the particle dispersion by utilizing either phosphate or chromate in the treating liquid.

In an attempt to improve upon this technique, U.S. Pat. No. 4,681,377, issued Oct. 21, 1986 to Nakamura et al., suggests utilizing in the emulsion-resin solution a dispersion improver that is generally a nonionic-, ionic-, cationic-, or amphoteric- type surface-active agent.

U.S. Pat. No. 4,705,578, issued Nov. 10, 1987 discloses a method of constructing laminations of an amorphous alloy suitable for use in a magnetic core for static electrical inductive apparatus. The laminate formed will have an improved space factor and reduced core losses. The method generally consists of pressure annealing the metal laminations together without the use of polymer between the laminations. After the stress-relief anneal process step, the group of laminations may be edge bonded with a U.V. curable resin, as long as the resin is not allowed to penetrate the space between the laminations, to aid handling and to prevent the brittle laminations from shedding flakes.

U.S. Pat. No. 4,753,822, issued Jun. 28, 1988 to Van Mensvoort, teaches that the presence of the insulating layer on only a part of the surface is in many cases sufficient to suppress the occurrence of eddy currents. The insulating layer serves as a spacer between the laminations.

U.S. Pat. No. 5,018,267, issued May 28, 1991 to Schoen discloses a method for forming a laminate in which a thin layer of oil is applied to a facing of at least one of a plurality of adjacent sheets and a wax is applied along the longitudinal edges of a facing surface of at least one of the sheets. The sheets are combined into a laminate by being passed between a pair of rollers which apply sufficient pressure to remove excess oil from between the facing surfaces and to spread the wax thereby forming a continuous seal along the longitudinal edges of the laminate.

While the above references disclose methods of forming laminations and laminate structures that are suitable for use in applications such as electric power transformers, motors and electronics, they all suffer from one or more disadvantages. For example, the prior art references teach the use of nonoriented silicon steel having a silicon content in the 2 to 3 percent range instead of the more economical carbon or motor laminate steel having a much lower alloy content. Also in utilizing chemical bonding to hold laminates together the bonding agent is generally applied with a solvent that tends to cause shrinkage as it evaporates, or if vaporized under elevated temperature and pressure may cause blow holes. Such shrinkage, particularly for thin metal sheets, may strain or induce stress into the sheets. A further disadvantage of using chemical bonding is that an elevated temperature may be required to cure the bonding agent. Such an elevated temperature may diminish the effects of domain refinement treatments for electrical steel sheets.

It is therefore one object of the present invention to provide an improved method of making laminations.

It is therefore another object of the present invention to provide a method of making chemically bonded laminates that will not suffer from shrinkage problems nor require elevated temperatures for curing.

It is a further object of the present invention to provide for laminate structures having low interlaminar core loss.

It is still a further object of the present invention to provide for a method of making laminations from low alloy content steel.

It Is still a further object of the present invention to provide for an improved method of manufacturing making insulated electrical coils.

SUMMARY OF THE INVENTION

According to one embodiment of the present invention there is provided a method of making a laminate stack having utility in electrical inductive apparatus. The method comprises coating at least one side of a metal substrate with a solventless liquid resin system comprising an ultraviolet ("UV") radiation curable acrylic and vinyl monomer and a heat reactive thermoset adhesive resin. The liquid coating on the coated metal substrate is then exposed to ultraviolet radiation to cure the UV radiation curable monomer portion of the resin system forming the liquid coating into a tacky solid layer to form a lamination. The laminations so formed can be assembled into components for use in applications such as electric power transformers, ignition coils, generators, chokes, reactors, solenoids, ballasts, motors and electronics, in which prior art laminates have been utilized. Once formed, the assembled laminate structures are exposed to heat to cure the heat reactive thermoset adhesive resin and adhere the structure together.

DETAILED DESCRIPTION OF THE INVENTION

Figure 1:
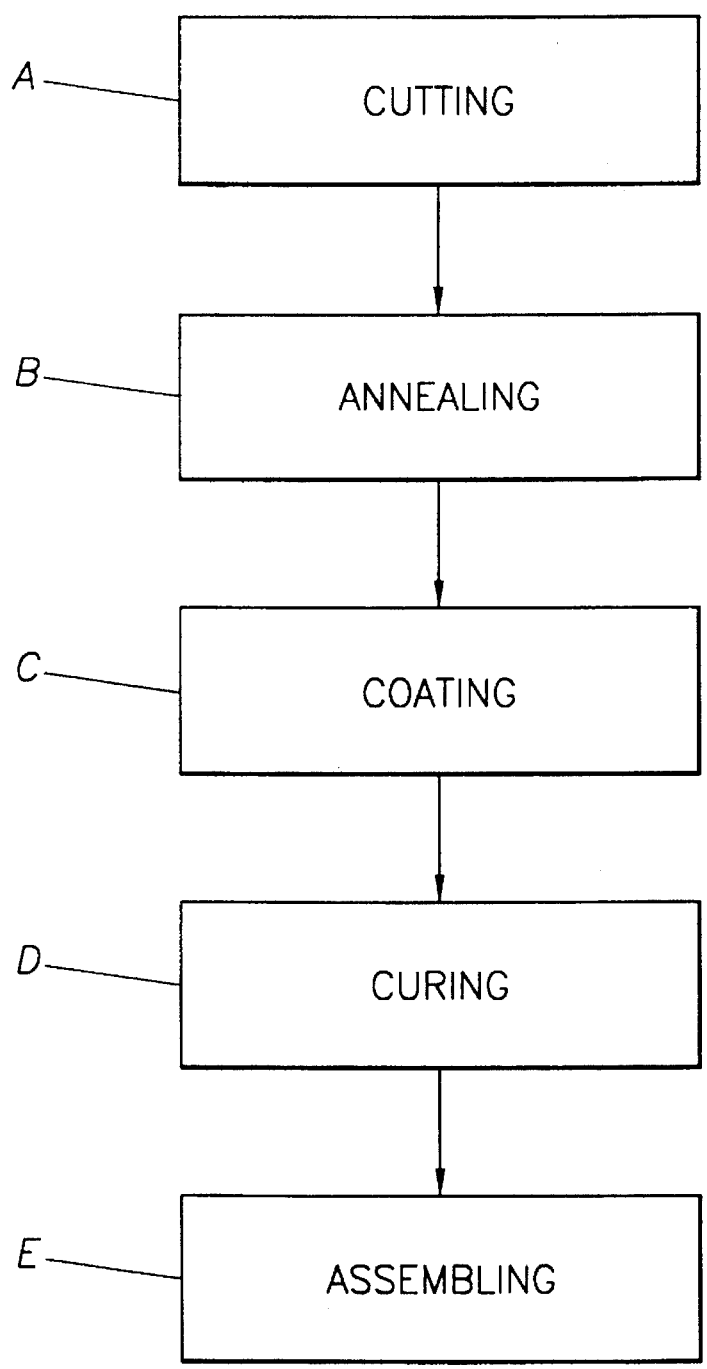
FIG. 1 is a block diagram of one embodiment of the process of the present invention.

Referring now to FIG. 1 which is a block diagram of one embodiment of the process of the present invention, step (A) is the cutting step in which a metal substrate is cut to the desired shape for the application in which it will be utilized, generally from a roll of steel or other suitable material. Next in step (B) the metal is annealed at proper annealing temperatures by methods well known to those in the annealing art. In step (C) a coating of a solventless liquid resin system comprising an ultraviolet radiation curable acrylic or vinyl monomer and a heat reactive thermoset adhesive resin is applied to at least one side of the metal substrate. Once coated, the resin system is exposed in step (D) to ultraviolet radiation to cure the ultraviolet radiation curable monomer portion of the resin system and form the coating into a solid tacky layer to form a lamination. Finally, in step (E) one or more of the formed laminations are assembled into an assembly or subassembly to be utilized in applications such as electric power transformers, ignition coils, generators, chokes, reactors, solenoids ballasts, motors and electronics, in which prior art laminates have been utilized. Once assembled, the polymer system is exposed to heat to cure the heat reactive thermoset adhesive resin portion of the resin system and adhere the assembly together.

The substrate utilized in the lamination of the present invention may comprise any material that is suitable for use in electrical inductive apparatus. Generally the substrate will comprise steel or an amorphous alloy. Preferably, the substrate will comprise low silicon content steel comprising in the range of about 1 to about 1.5 percent silicon. Suitable commercially available types of steel include Type VI motor lamination steel available from LTV Steel Company, and HPS Z3 motor lamination steel available from Kawasaki Steel Company.

When a lamination made according to the present invention is to be incorporated into, for example, a coil, the substrate will comprise a conductive material such as bare aluminum, anodized aluminum or copper.

The thickness of the substrate utilized in the present invention will depend upon the application for which the lamination will be utilized. Typical thicknesses of the lamination substrate are in the range of about 0.005 inches to about 0.05 inches. Preferably, the thickness of the lamination substrate will be in the range of about 0.008 inches to about 0.025 inches for magnetic laminations; with thickness in the higher range for conductors.

In a preferred conductor strip embodiment of the present invention, the aluminum substrate utilized may first be anodized utilizing phosphoric or sulfuric acid prior to coating to improve dielectric properties. The resulting dielectric strength is greater than the sum of the dielectric strengths of the individual coatings.

The solventless liquid resin system of the present invention may be applied to the substrate by any suitable method. Methods suitable for use in the present invention for applying the liquid resin system to the substrate include dipping, diffusion-bonding, rollcoating, coextrusion and spraying. Preferably, the liquid resin system is roll-coated onto the substrate to form a uniform coating on at least one side of the substrate.

In the roll-coating operation, once the substrate is cut to the desired dimensions, annealed and blued, it is then transported toward a coating station to be coated. At the coating station, the substrate will pass through a pair of coating rollers of controlled clearance at which point the substrate may be coated on one or both sides. Because hundreds of laminations will be stacked in a transformer core, thickness deviations could be multiplied hundreds of times, it is important that a uniform coating be applied.

The thickness of the polymer layer on the substrate will depend upon the application for which the lamination will be utilized. Generally, when utilized in transformer cores, the thickness of the polymer layer will be in the range of about 0.0001 inches to about 0.0005 inches. For most applications, the thickness of the polymer layer will preferably be in the range of about 0.0002 inches to about 0.0003 inches. For conductor strips, the thickness is preferably about 0.0004 inches. The thickness of the layer is generally controlled by controlling the viscosity of the liquid polymer being applied, which is generally controlled by adjusting the temperature of the liquid polymer being applied. Typical viscosities for the ultraviolet radiation curable polymer applied to the substrate will generally be in the range of about 1 cp. to about 20,000 cp. Preferably, the polymer application viscosity will be in the range of about 2,000 cp. to about 7,000 cp.

A commercially available roll-coating machine suitable for use in the present invention includes the Differential Direct Roll Coater Model #344-44 or #344-56 manufactured by Black Brothers Company (Mendota, Ill.).

According to the process of the present invention, once the substrate has been coated with a uniform coating of desired thickness it is then transported to a curing station. At the curing station, the ultraviolet radiation curable polymer coating is exposed to ultraviolet radiation such that the polymer coating is either fully cured to a hard cure stage or cured until the liquid coating is a solid film with just a little tack (B-stage). Tack or tackiness is generally the property of being sticky or adhesive.

Fully cured coatings would lack any appreciable amount of residual adhesive and generally would not be suitable for bonding applications. B-stage cured coatings generally have an appreciable amount of residual adhesive and generally are suitable for bonding applications. Laminations with fully cured coatings utilized in an application requiring bonding will need a second B-Stage coating applied over the fully cured coating to provide for adhesion, or must be mechanically joined together with, for example, clamps.

The advantage of using two coatings is that problems caused by coating defects such as pin holes is greatly reduced as 2 pin holds in each layer would have to be aligned to cause a short between substrates.

An advantage of using the B-staged coating, whether as a first or second layer, is that coils can be wound from such double coated substates without the addition of paper interlayer insulation or tape. Duct spacers can be applied as needed by simply applying the duct spacer to the tacky surface where it will be held firmly in place without tape.

Figure 2:
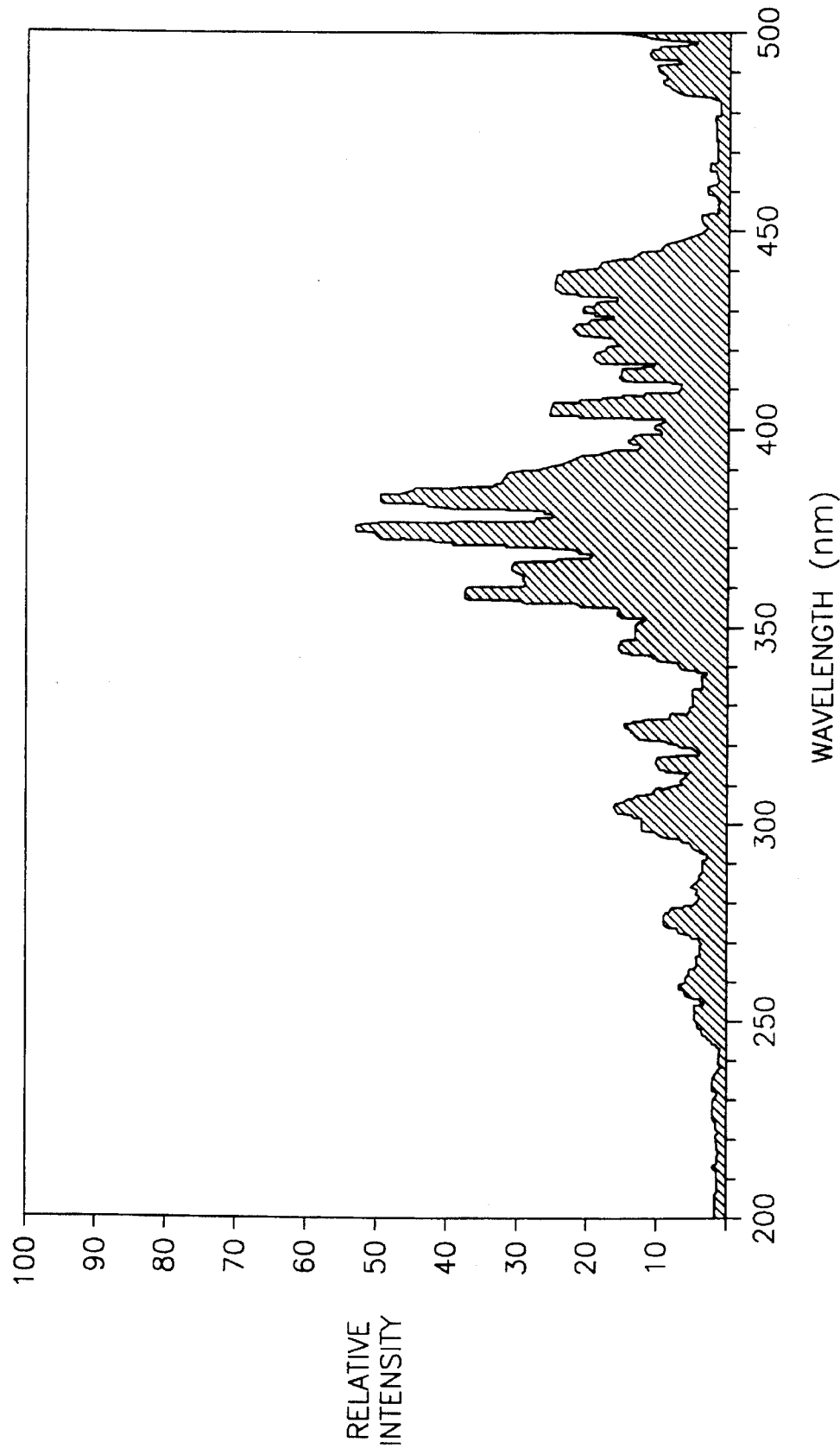
FIG. 2 is a graph of the wave length distribution for a D-bulb, showing wavelength versus relative intensity.

The degree of curing of the polymer layer is controlled by adjusting among other factors, the intensity of the ultraviolet radiation, the range of wavelengths and wavelength distribution of the ultraviolet radiation, the distance between the source of the ultraviolet radiation and the polymer coating and the residence time that the polymer is exposed to the light. In the present invention, residence times are generally in the range of about 0.001 seconds to about 15 minutes. The intensity of the ultraviolet radiation is generally in the range of about 600 W/in of bulb length. The wavelength of the ultraviolet radiation generally ranges from about 200 nm to about 500 nm. A suitable commercially available ultraviolet radiation curing system includes the EPIQ 6000 available from Fusion UV Curing systems. The EPIQ 6000 D-Bulb spectrum shown in FIG. 2 is suitable for use in the present invention.

The polymer utilized in the present invention is generally a heat reactive adhesive resin, containing a monomer and an ultraviolet radiation photoinitiator. Suitable examples of such polymers include those disclosed in U.S. Pat. No. 4,239,077, issued Dec. 16, 1980 to Dixon et al. and herein incorporated by reference.

The thermosetting base adhesive resin particularly applicable is an epoxy resin (glycidylpolyether of a dihydric phenol) as disclosed by Dixon et al. More particularly, the resin suitable for use in this invention is a solventless epoxy/phenolic type of resin. Epoxy resins are well known in the art. They are generally the reaction products of bisphenol A and epichlorohydrin, and are usually used in conjunction with acid anhydride, amine, amide, or organo metallic heat reactive curing agents. The epoxy resin may be modified by addition of additives such as epoxy esters of diabasic acids and imidazoles, to improve flexibility, cure and bonding to the supporting substrate. The resin system may also contain pigments for coloring. Other suitable thermoset base resins are polyester resins polyurethane resins and polyacrylic resins. The resin used must, of course, be compatible with transformer oil if the lamination is to be used in oil-filled transformers. For a detailed description of all of these resins, their method of preparation, and catalysts and curing agents useful therewith, reference can be made to Brydson, *Plastic Materials,* 1966, herein incorporated by reference.

A wide variety of heat reactive catalysts and curing agents, such as metal oxides, peroxides, azo compounds, acid anhydrides, organo-metallics such as organotin or organo-boron compounds, and the like, known to be effective with the particular base resin, can be used in this invention. Effective amounts of such catalysts or curing agents will be between about 0.5 wt. % to about 20 wt. % based on the weight of the thermoset resin. In the preferred epoxy resin system of this invention, the amount of curing agent will range between about 5 wt. % to about 20 wt. % based on epoxy weight. The term "heat reactive adhesive resin" is meant to include the particular resin along with a suitable curing agent or catalyst which will allow heat curing.

In the resin system of this invention, the epoxy or other base resin remains substantially unreacted until final heat curing. The "B"-stage gelation is caused by polymerization or cross-linking of an acrylic or vinyl reactive diluent, by action of the photoinitiator in response to ultraviolet (UV) radiation. It is important to note that the B-stage as described herein, is not the traditional B-stage, but rather for the resin system the monomer is substantially C-staged and the heat reactive resin is substantially A-staged. The ratios of the monomer and the heat reactive resin are such that upon curing the monomer to the C-stage, the resin system on the whole becomes a solid film with tack, thus simulating what is normally a B-stage condition. The resin system of this invention must contain from about 10 parts to about 80 parts, preferably 20 to 35 parts by weight of an acrylic or vinyl monomer per 100 parts base heat reactive thermoset adhesive resin, such as epoxy.

Useful acrylic monomers are simple acrylates, or multi-function (di-, tri- or tetra-) acrylates. Useful simple acrylic monomers include 2-ethyl hexyl acrylate; 2-hydroxy ethyl acrylate, and the like; alkoxy ethyl acrylate monomers, such as 2-methoxy ethyl acrylate; 2-ethoxy ethyl acrylate, and the like; and aryl ethyl acrylate monomers, such as 2-phenoxy ethyl acrylate. Useful multifunctional acrylic monomers include hexanediol diacrylate; neopentyl glycol diacrylate; tetra ethylene glycol diacrylate; trimethylol propane tri-acrylate; pentaerythritol tri-acrylate, pentaerythritol tetracrylate and the like. Useful vinyl monomers include styrene, vinyl toluene, vinyl pyrrolidone; vinyl acetate; divinyl benzene, and the like. Under 10 parts acrylic or vinyl per 200 parts base resin results in poor solubility of the base resin so that the viscosity of the resin system is unacceptably high. Over 80 parts acrylic or vinyl per 100 parts basic resin will reduce the final hardness and adhesive nature of the base resin. The acrylates and vinyls can be used alone or in combination.

Photoinitiators must be added to the resin system in an amount effective to respond to ultraviolet light and to initiate and cause substantial polymerization of the acrylic or vinyl monomers, in order to "B-stage" the resin system. This B-stage results by the use of UV radiation, without heat, i.e., gelling the monomers in the resin system to a point where the entire system becomes fusible and dry to the touch, yet flexible and capable of subsequent complete cure by heating between about 100° C. and 220° C. This subsequent heating will cause a reaction between the curing agent and the base resin, such as epoxy. Thus at this B-stage, the monomers are substantially or fully cured and the heat reactive thermosets are uncured. Typical ultraviolet radiation sensitive photoinitiators, well known in the art, would include, for example, benzophenone; diethoxyacetophenone, benzoin methyl ether, benzoin ethyl ether;, benzoin isopropyl ether; benzoin isobutyl ether; diethoxy-xanthanone; chlorothio-xanthanone; azo-bis-isobutyronitrile; N-methyl diethanolamine-benzophenone, mixtures thereof, and the like.

The photoinitiators are used in the amount effective to cause polymerization crosslinking of the monomers. This effective amount is between 0.25 wt. % to about 7.5 wt. % abased on the weight of total acrylic and vinyl monomer in the resin system. Use of under about 0.25 wt. % will result in minimal gelation, with subsequent flow during adhesive curing. Use of over about 7.5 wt. % will result in reaction between the initiator itself, causing a self-quenching effect with little monomer linking.

An example of polymer material suitable for use in the present invention includes an epoxy resin, LS-4492-4H, from The P. D. George Company (St Louis, Mo.).

Once formed, the laminations made according to the process of the present invention may be utilized in various types of applications such as electric power transformers, ignition coils, generators, chokes, reactors, solenoids ballasts, motors and electronics, in which prior art laminates have been utilized. For example, various designs and methods have been utilized to form transformer core assemblies as shown in U.S. Pat. Nos. 4,827,237 to Blackburn, 4,594,295 to Waasner et al. and 4,480,377 to House et al., all herein incorporated by reference.

In addition, the laminations of the present invention may be utilized according to the various designs and methods disclosed and described in U.S. patent application Ser. No. 07/614,812, filed on Nov. 16, 1990 by Hayes et al., now U.S. Pat. No. 5,073,766, herein incorporated by reference.

Hayes et al. discloses a transformer core and a method for assembling the transformer core utilizing a plurality of multi-leg laminations and a plurality of generally I-shaped laminations. Two types of generally E-shaped laminations are utilized in the construction of the core assembly, type "All laminations which are formed from one or more type "All generally E-shaped steel core members and type "B" laminations which are formed from one or more type "B" generally E-shaped steel core members. The width of each lamination is determined by the width and number of steel core members comprising the lamination. Both type A and type B laminations have two legs extending approximately the same distance and an outer third leg extending a distance substantially greater than the distance extended by the other two legs, providing an extending outer leg portion on both laminations. Additionally, the base of type A laminations includes notched segments and indentations from the outer periphery of the base which cooperate with shims during the assembly process.

The transformer core of Hayes et al. is assembled by alternately positioning type B and type A laminations such that the extending outer leg portions of all type A laminations are on one side and the extending outer leg portions for all type B laminations are on the opposite side. These laminations are stacked on a pair of stacking shims which are received in the notches and indentations of the type A laminations and provide for alternate variations in the height of the middle leg of each type A lamination as compared with the middle leg of each type B lamination. That variation in height of the middle legs is equal to the depth of the notches or indentations, since the dimensions of the type A and type B laminations are otherwise substantially equal.

Critical dimensions are established for both type A and type B laminations to provide uniformity of design and enhance performance of the transformer. once the type A and type B laminations have been properly positioned during assembly of the core, coils are slipped over the respective legs of the core and the I-shaped shaped laminations are readily position as part of the core assembly. Uniformity of design reduces sharp edges and other variations which can cut through the coil insulation and impact performance of the transformer.

The alternate positioning of type A and type B laminations provides spacing for the plurality of generally I-shaped laminations having the same width as the type A and B laminations. spaces are provided between outer leg port ions of adjacent type A or type B laminations on each side. The channels are provided as a result of the recessed association of the type A laminations caused by the notches. This facilitates both ready and stable insertion of the I-shaped laminations, each of which is received between the extending outer leg portions of the E-shaped laminations, is supported on the middle legs and extends to the opposite extending outer leg portions. The fact that the I-shaped laminations are positioned at the top of the transformer core after the coils have been positioned, without requiring any "fishing" of the laminations through the coils, facilitates secure and ready assembly of the transformer core. Alternate I-shaped laminations are received within the channels formed by the middle legs. This also facilitates insertion of the other I-shaped laminations that are readily received in the spaces between the laminations that are received within the channels.

In the bonding application, the B-staged coated laminations are assembled into the device and then heated to active the adhesives. Some means must be provided to bring each lamination into intimate contact with its adjacent laminations, but excessive clamping pressure must be avoided or the adhesive will flow excessively, causing the substrates of the laminations to come into physical contact and electrically short, resulting in an increase in interlaminar eddy current losses.

One means of reducing such an increase in eddy current losses is to precoat the lamination substrate with a pressure resistant material. Examples of suitable pressure resistant material includes inorganic $C_4$ or $C_5$ type coatings or a blue ($Fe_3O_4$) type coating that may be provided during the annealing process.

EXAMPLES

Example 1

A 15 KVA three phase transformer core was made using the following sequence of operations: laminations as described in U.S. Pat. No. 5,073,766 were punched from bare nominally 0.018 inch thick Type VI motor laminations steel supplied by LTV Steel Company. These were annealed at about 1500° F. and blued and then given a 0.0002–0.0003 inch thick coating of P. D. George Company LS-4492-4H liquid U.V. curable resin by roll coating. This resin was then B staged with ultraviolet radiation in a conveyorized U.V. curing chamber. The conveyor speed was adjusted to provide just enough residence time to convert the liquid resin to a dry adherent film. The coated E and I laminations were then stacked into an E subassembly and a corresponding I subassembly and cured at 160° F. for 8 hours. The two subassemblies were welded together with the I lamination subassembly laying across the finger members of the E lamination subassembly. By utilizing the laminations of the present invention, the upper core clamps normally used to clamp the laminations together were able to be omitted.

When tested, the core had the characteristics shown in Table I.

TABLE I

| Flux Density kGauss | Core Loss watts/pound | Sound Level db |
|---|---|---|
| 12 | 1.49 | 45 |
| 13 | 1.75 | 46 |
| 14 | 2.10 | 47.5 |
| 15 | 2.45 | 51 |

Despite the absence of the upper clamps their core is relatively quiet.

Example 2

A 75 KVA three phase transformer was made using the following sequence of operations: laminations as described in U.S. Pat. No. 5,073,766 were punched from bare 0.018 inch thick HPS Z3 motor lamination steel manufactured by Kawasaki Steel Company. These were annealed and blued and then given a 0.0002–0.0003 inch thick coating of P. D. George Company LS-4492-4H liquid UV curable resin by roll coating. This resin was then B staged using ultraviolet radiation in a conveyorized UV curing chamber. The conveyor belt speed was adjusted to provide just enough residence time to convert the liquid resin to an adherent solid coating film. The coated E and I laminations were then stacked into an E subassembly and a corresponding I subassembly and clamped. The E and I subassembly laminations were then heated to about 150° C. for about eight hours. Coils were installed on the "legs" of the E and the I laminate subassemblies and welded in place to complete the magnetic circuits.

When tested their transformer had a 60 Hz core loss of 2.53 watts per pound at 15.0 kilo gauss.

Example 3

Three sets of aluminum substrate samples of approximate 9"×9" dimensions are used in this example: a bare untreated aluminum (21 mil substrate); regular sulfuric acid anodized aluminum (32 mil aluminum alloy 5005 substrate available from Lorin Industries with an approximate thickness of 60 microinches); and high density phosphoric acid anodized aluminum (32 mil aluminum alloy 5005 substrate available from Lorin Industries with an approximate thickness of two microinches).

All three samples are roll coated on one side with a novolak epoxy resin available from P. D. George as LS4939-3. The resin is cured to the C-stage utilizing ultraviolet light with the resulting layer having a 0.4 mil thickness.

The dielectric strength of the insulation was tested using brass ¼ inch electrodes according to ASTM specification D149, except that one electrode was in physical contact with the insulation, and the other electrode was in contact with the uncoated side of the aluminum substrate and was closest to ground potential.

From a sample size of 14 the following results presented in Table II were obtained.

TABLE II

| SUBSTRATE | DIELECTRIC BREAKDOWN (x) | VARIANCE |
| --- | --- | --- |
| Bare aluminum | 1.6 KV/mil | 0.61 KV/mil |
| H$_2$SO$_4$ anodized aluminum | 2.9 KV/mil | 0.97 KV/mil |
| H$_3$PO$_4$ anodized aluminum | 4.3 KV/mil | 0.94 KV/mil |

The three different coated substrates exhibited no detectable dielectric strength. The above results exhibit a synergistic effect between the anodizing and the coating. Applying the resin to the anodized aluminum surface allows the full dielectric strength of the aluminum oxide surface layer to be realized. Any cracks or defects in the anodized aluminum are repaired by the application of the resin coating.

Example 4

A transformer coil was constructed as follows. An aluminum strip substrate was coated on both sides with a novolak epoxy resin available from P. D. George as LS4939-3 which is then cured to the C-stage using ultraviolet light. A second coating having both a heat curable resin component and a UV curable acrylate ester component, available from P. D. George as LS4492-14, is applied to one side of the substrate. This second coating is then exposed to ultraviolet light to C-stage the UV curable component while the heat curable component remains in the A-stage, resulting in a solid tacky "B-stage" coating. The aluminum strip is then formed into a coil and baked in an oven to thermoset the heat curable component in the second coating.

The formed coil consisted of 10 turns of 10 inch wide aluminum strip 21 mils thick, with a mean coil diameter of 10 inches.

The coil was assembled into a core with an insulated copper wire coil of 24 turns. With the 24 turn coil acting as the primary, up to 60 volts was applied and the aluminum strip secondary responded with a 44 volt potential.

Example 5

Aluminum strip samples of approximate 9"×9"×0.021" dimensions were coated on both sides with a a novolak epoxy resin available from P. D. George as LS4939-3 which is then cured to the C-stage using ultraviolet light. A second coating having both a heat curable resin component and a UV curable acrylate ester component, available from P. D. George as LS4492-14, is applied to one side of the substrate. This second coating is then exposed to ultraviolet light to C-stage the UV curable component while the heat curable component remains in the A-stage, resulting in a solid tacky "B-stage" coating.

The samples were then placed in an over to fully cure the second coating layer. The resulting lamination consisted of a 21 mil aluminum substrate with a first coating layer 4.5 mils thick on both sides, with an additional second layer 6.0 mils thick on one side.

The average dielectric breakdown was 1.7 KV/mil with a variance of 0.8 KV/mil. The results when compared to Table II of Example 3 indicate that the nominal dielectric strength does not increase or decrease with increased layers.

It is seen that the present invention and the embodiments disclosed herein are well adapted to carry out the objectives and obtain the ends set forth at the outset. Certain changes can be made in the method without departing from the spirit and the scope of this invention. It is realized that changes are possible and it is further intended that each element recited in any of the following claims is to be understood as referring to all equivalent elements for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

Those skilled in the art may find many variations and adaptations thereof, and all such variations and adaptations, falling within the true scope and spirit of applicants, invention, are intended to be covered thereby.

We claim:

1. A method for forming a metal laminate stack suitable for use in an electrical inductive apparatus, comprising the steps of:

(a) coating at least one side of a metal substrate with a polymer to form a first layer;

(b) curing the polymer to the C-stage to form a first solid layer;

(c) applying to the first solid layer, a solventless liquid resin system comprising an ultraviolet radiation curable acrylic or vinyl monomer and a heat reactive thermoset adhesive resin, to form a second layer;

(d) exposing the resin system to ultraviolet radiation to cure the ultraviolet radiation curable monomer to the C-stage while the heat reactive resin remains in the A-stage to form the second layer into a second solid layer with tack thus forming a lamination;

(e) assembling at least two laminations formed as in step (d) into a laminate stack, wherein the laminations are oriented such that the solid layers are between laminations; and (f) heating the laminate stack to a temperature sufficient to cure the heat reactive thermoset resin of the second solid layer and adhere the substrates together.

2. The method of claim 1 wherein the thermoset adhesive resin comprises an epoxy/phenolic polymer.

3. The method of claim 1 wherein the resin system comprises in the range of about 10 parts to about 80 parts monomer per 100 parts of heat reactive thermoset adhesive resin.

4. The method of claim 1 wherein the acrylic monomer is selected from the group of monomers consisting of acrylates and di-, tri- or tetra-acrylates.

5. The method of claim 1 wherein the vinyl monomer is selected from the group of monomers consisting of styrene, vinyl toluene, vinyl pyyrolidone, vinyl acetate and divinyl benzene.

6. The method of claim 1 wherein the metal substrate comprises steel or amorphous metal.

7. The method of claim 1 wherein the metal substrate of step (a) onto which the polymer is coated further comprises an inorganic $C_4$ or $C_5$ type coating or a blue ($Fe_3O_4$) type coating.

8. The method of claim 1 wherein the vinyl monomer is selected from the group of monomers consisting of styrene, vinyl toluene, vinyl pyrrolidone, vinyl acetate and divinyl benzene.

9. A method for forming an electrically conductive coil suitable for use in an electrical inductive apparatus, comprising the steps of:

(a) coating at least one side of a conductive substrate with a polymer to form a first layer;

(b) curing the polymer to the C-stage to form a first solid layer;

(c) applying to the first solid layer, a solventless liquid resin system comprising an ultraviolet radiation curable acrylic or vinyl monomer and a heat reactive thermoset adhesive resin, to form a second layer;

(d) exposing the resin system to ultraviolet radiation to cure the ultraviolet radiation curable monomer to the C-stage while the heat reactive resin remains in the A-stage to form the second layer into a second solid layer with tack thus forming a coated conductor strip;

(e) forming the strip of step (d) into a coil; and (f) heating the coil to a temperature sufficient to cure the heat reactive thermoset resin of the second solid layer and adhere the coil together.

10. The method of claim 9 wherein the thermoset adhesive resin comprises an epoxy/phenolic polymer.

11. The method of claim 9 wherein the resin system comprises in the range of about 10 parts to about 80 parts monomer per 100 parts of heat reactive thermoset adhesive resin.

12. The method of claim 9 wherein the acrylic monomer is selected from the group of monomers consisting of acrylates and di-, tri or tetra-acrylates.

13. The method of claim 9 wherein the conductive substrate comprises bare aluminum, anodized aluminum or copper.

* * * * *